United States Patent
Fan et al.

(10) Patent No.: US 11,364,903 B2
(45) Date of Patent: Jun. 21, 2022

(54) AUTOMATED GUIDE VEHICLE WITH A COLLISION AVOIDANCE APPARATUS

(71) Applicant: Logistics and Supply Chain MultiTech R&D Centre Limited, Pok Fu Lam (HK)

(72) Inventors: Ka Lun Fan, Pok Fu Lam (HK); Wing Leung Chow, Pok Fu Lam (HK); Lu Sze Wai, Pok Fu Lam (HK); Yuan Li Yin, Pok Fu Lam (HK)

(73) Assignee: Logistics and Supply Chain MultiTech R&D Centre Limited, Pok Fu Lam (HK)

( * ) Notice: Subject to any disclaimer, the term of this patent is extended or adjusted under 35 U.S.C. 154(b) by 460 days.

(21) Appl. No.: 16/145,738

(22) Filed: Sep. 28, 2018

(65) Prior Publication Data

US 2020/0101971 A1    Apr. 2, 2020

(51) Int. Cl.
| | |
|---|---|
| *G05D 1/02* | (2020.01) |
| *G05D 1/00* | (2006.01) |
| *G06V 20/58* | (2022.01) |
| *B60W 30/095* | (2012.01) |
| *G01S 17/931* | (2020.01) |

(52) U.S. Cl.
CPC ....... *B60W 30/0956* (2013.01); *G01S 17/931* (2020.01); *G05D 1/0088* (2013.01); *G05D 1/024* (2013.01); *G05D 1/0214* (2013.01); *G05D 1/0236* (2013.01); *G06V 20/58* (2022.01); *G05D 2201/0216* (2013.01)

(58) Field of Classification Search
CPC .. B60W 30/0956; G01S 17/931; G01S 17/04; G01S 17/42; G01S 17/10; G06K 9/00805; G06K 9/4661; G05D 1/0236; G05D 1/0088; G05D 1/0214; G05D 1/024; G05D 2201/0216; G05D 1/0234; B65G 1/065; G06V 20/58
See application file for complete search history.

(56) References Cited

U.S. PATENT DOCUMENTS 9,323,250 B2 *   4/2016  Wang ..................... B25J 11/009
9,519,284 B2 * 12/2016  Wurman ............ G05B 19/4189
(Continued)

FOREIGN PATENT DOCUMENTS

KR       20150105930 A  *  9/2015

OTHER PUBLICATIONS

Yamamoto Harumasa KR-20150105930-A English translation of Description (Year: 2015).*

*Primary Examiner* — Nicholas Kiswanto
*Assistant Examiner* — Danielle Marie Jackson
(74) *Attorney, Agent, or Firm* — Renner, Kenner, Greive, Bobak, Taylor & Weber

(57) ABSTRACT

A collision avoidance apparatus for use with an automated guided vehicle (AGV) includes: an object detection sensor assembly; a controller in electronic communication with the sensor assembly; the object detection sensor assembly configured to generate a detection signal to define a sensing region and receive a reflected detection signal; the controller configured to: process the reflected signal to detect presence of an object based on a parameter of the reflected signal, define a boundary within the sensing region, dynamically adjust the size and/or shape of the boundary, and determine if the detected object is located within the boundary.

25 Claims, 11 Drawing Sheets

(56) References Cited

U.S. PATENT DOCUMENTS

2016/0059854 A1* 3/2016 Ohsugi .............. B60W 30/085
                                                    701/50
2017/0269591 A1* 9/2017 Tanaka ................. G05D 1/0022
2017/0374511 A1* 12/2017 Buchmann ................ B66F 9/24

* cited by examiner

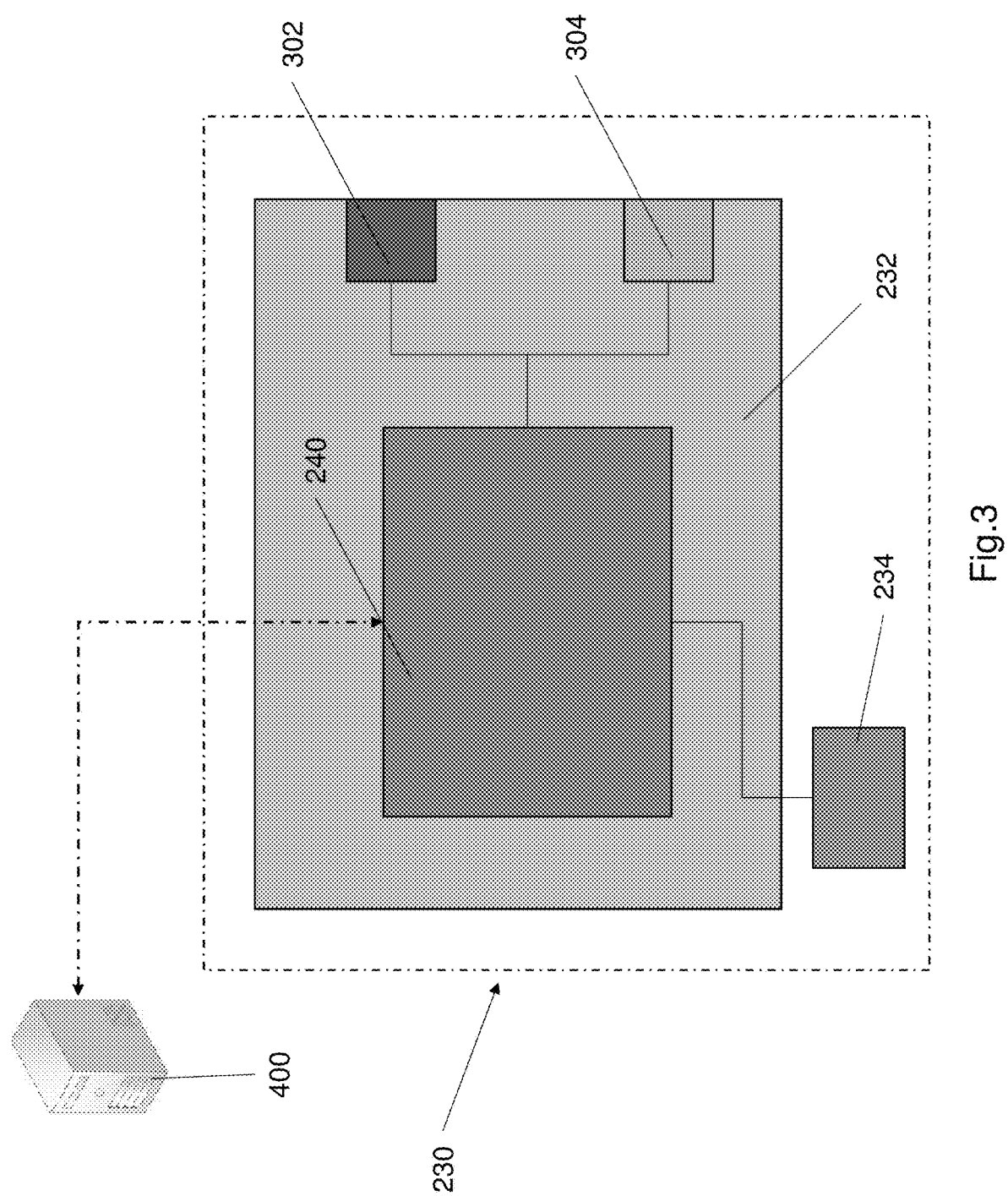

AUTOMATED GUIDE VEHICLE WITH A COLLISION AVOIDANCE APPARATUS

TECHNICAL FIELD

The present disclosure relates to a collision avoidance apparatus for use with an automated guided vehicle (AGV). In particular, the present disclosure relates to a collision avoidance apparatus and method for use with an automated guided vehicle (AGV) that is used in indoor environments. The present disclosure also relates to an automated guided vehicle (AGV) comprising a collision avoidance apparatus.

BACKGROUND

Warehousing is becoming increasingly popular especially with the increasing popularity of online shopping and delivery of goods. Warehouses are an example of an indoor environment where automated guided vehicles are commonly used. An automated guided vehicle (AGV) is a mobile robot that is used in a warehouse for various functions such as moving shelving racks or moving goods between shelves or stacking goods etc. Often multiple AGVs are used in an indoor environment e.g. in a warehouse. Due to space constraints in an indoor environment there is always a risk of collisions between AGVs in an indoor environment and/or collisions between the AGVs and other objects within an indoor environment.

SUMMARY OF THE INVENTION

The present disclosure relates to a collision avoidance apparatus for use with an AGV, in particular the present disclosure relates to a collision avoidance apparatus for use with an AGV adapted for use in indoor environments such as for example warehouses. The present disclosure also relates to an automated guided vehicle comprising a collision avoidance apparatus.

It is an object of the present invention to provide at least one of a collision avoidance apparatus, an automated guided vehicle comprising a collision avoidance apparatus for use with an automated guided vehicle, or provide the public with a useful alternative.

Other objects of the invention (or inventions) may become apparent from the following description and drawings, which is given by way of example only.

In accordance with a first aspect the present invention relates to a collision avoidance apparatus for use with an automated guided vehicle (AGV), the collision avoidance apparatus comprising:
 an object detection sensor assembly;
 a controller in electronic communication with the sensor assembly;
 the object detection sensor assembly is configured to generate a detection signal to define a sensing region and receive a reflected detection signal;
 the controller is configured to:
 process the reflected signal to detect presence of an object based on a parameter of the reflected signal,
 define a boundary within the sensing region,
 dynamically adjust the size and/or shape of the boundary, and
 determine if the detected object is located within the boundary.

In an embodiment the controller is configured to generate a control signal to disable the AGV if an object is detected within the boundary and/or generate an alert.

In an embodiment the object detection sensor assembly comprises at least one emitter and one or more receivers, wherein the at least one transmitter is configured to transmit the detection signal and the one or more receivers is configured to receive the reflected signal, the reflected signal being reflected off one or more objects.

In an embodiment the boundary is a two dimensional polygon.

In an embodiment the emitter is configured to emit a two dimensional detection signal, which defines a two dimensional sensing region and the controller is further configured to overlay the boundary onto the sensing region.

In an embodiment the controller is configured to adjust one or more of a length or width of the boundary.

In an embodiment the controller is configured to adjust the one or more of a length or width of the boundary based on the position of the object detection sensor assembly relative to a position marker defining a desired position.

In an embodiment the controller is configured to resize the boundary once the desired position is reached.

In an embodiment the detection signal and reflected signal are optical signals or acoustic signals or infrared signals.

In an embodiment the detection signal and reflected signal are laser signals such that the object detection sensor assembly is configured to determine the presence of the object based on the laser detection signal and the laser reflected signal.

In an embodiment the collision avoidance apparatus is disposed within a housing and the housing is adapted to be retrofitted to an AGV used within an indoor environment.

In accordance with a second aspect the present invention relates to an automated guided vehicle (AGV) for use within an indoor environment comprising:
 a chassis;
 one or more movement structures supported by the chassis;
 a drive assembly disposed on or within the chassis and being coupled to the one or more movement structures, the drive assembly is configured to drive the one or more movement structures;
 a collision avoidance apparatus disposed on the chassis, wherein the collision avoidance apparatus comprising:
 an object detection sensor assembly mounted on or within the chassis, the object detection sensor assembly being configured to generate a detection signal to define a sensing region and receive a reflected detection signal;
 a position detection sensor mounted on or within the chassis, the position detection sensor is configured to generate a position signal;
 a controller arranged in electronic communication with the object detection sensor assembly and the position detection sensor, the controller is configured to:
 process the position signal and determine a position of the automated vehicle within the indoor environment,
 process the reflected detection signal to detect presence of an object based on a parameter of the reflected detection signal,
 define a boundary within the sensing region,
 dynamically adjust the size and/or shape of the boundary relative to a predetermined position, and
 determine if the detected object is located within the boundary.

In an embodiment the position detection sensor is a camera that is positioned on an underside of the chassis and wherein the camera is configured to detect one or more markers located within the environment.

In an embodiment each marker corresponds to a location within the environment, the markers are arranged in a two dimensional grid on the floor of the environment.

In an embodiment the collision avoidance apparatus is removably coupled to the chassis.

In an embodiment the object detection sensor assembly comprises a transmitter and a receiver, the transmitter is configured to transmit the detection signal and the receiver is configured to receive the reflected detection signal, and wherein the controller is configured to process the reflected detection signal to detect the presence of an object within the sensing region based on a parameter of the reflected signal.

In an embodiment the parameter may be one of a time of flight, frequency or amplitude.

In an embodiment the movement structures are wheels, the AGV comprises two wheels disposed on opposing sides of the chassis and the AGV further comprises at least one odometer disposed on at least one of the two wheels, wherein the odometer gathers distance information relating to the distance travelled by the AGV and transmits distance information to the controller.

In an embodiment the detection signal is a laser signal.

In an embodiment the transmitter is controlled to transmit laser pulses at a predetermined frequency.

In an embodiment the boundary is rectangular in shape and the controller is configured to dynamically vary the size and/or shape boundary as the AGV moves toward the predetermined position.

In an embodiment the length of the boundary is reduced relative to the predetermined position based on the amount the AGV has moved relative to the predetermined position.

In an embodiment the controller is configured to reduce the length of the boundary by the distance travelled by the AGV defined by the distance information.

In an embodiment the boundary is removed once the AGV has reached the predetermined position.

In an embodiment the AGV further comprises a lifting unit that includes a lifting mechanism and one or more lifting arms, the lifting mechanism is coupled to the lifting arms and configured to move the lifting arms, the lifting unit further comprising one or more contact sensors that are configured to detect when the lifting arms are engaged with an object.

In an embodiment the shape of the boundary is adjusted from a first shape to a second shape when a lifting arm of the AGV is in contact with and lifted an object such that the second shape avoids detecting false positives when the AGV moves with the lifted object.

In an embodiment the first shape is different to the second shape, and wherein the first shape is a rectangle and the second shape is a triangle extending outwardly from the AGV with a rectangle extending outwardly from the base of the triangle.

In accordance with a third aspect the present invention relates to a method of collision avoidance for an automated guided vehicle (AGV) within an indoor environment comprising the steps of:

receiving a reflected detection signal;

processing the reflected detection signal to determine presence of an object based on a parameter of the reflected detection signal;

defining a boundary within a sensing region, the sensing region being defined by a sensing signal, dynamically adjusting the size and/or shape of the boundary relative to a predetermined position in the indoor environment, determining if the detected object is located within the boundary, providing a control signal to a drive assembly of the AGV to stop the AGV if an object is detected within the boundary.

In an embodiment the boundary is rectangular in shape and the size and/or shape of the boundary are dynamically varied as the AGV moves toward the predetermined position.

In an embodiment the length of the boundary is reduced relative to the predetermined position based on the amount the AGV has moved relative to the predetermined position.

In an embodiment the length of the boundary is reduced by a distance travelled by the AGV relative to the predetermined position.

In an embodiment the distance travelled is determined based on distance information received from one or more odometers that are disposed on a wheel of the AGV.

In an embodiment the method is implemented by a controller comprising a processor and a memory unit, the memory unit storing instructions defining the method steps and the processor configured to process the instructions such that the method steps are executed by the controller.

It is intended that reference to a range of numbers disclosed herein (for example, 1 to 10) also incorporates reference to all rational numbers within that range (for example, 1, 1.1, 2, 3, 3.9, 4, 5, 6, 6.5, 7, 8, 9 and 10) and also any range of rational numbers within that range (for example, 2 to 8, 1.5 to 5.5 and 3.1 to 4.7) and, therefore, all sub-ranges of all ranges expressly disclosed herein are hereby expressly disclosed. These are only examples of what is specifically intended and all possible combinations of numerical values between the lowest value and the highest value enumerated are to be considered to be expressly stated in this application in a similar manner.

This invention may also be said broadly to consist in the parts, elements and features referred to or indicated in the specification of the application, individually or collectively, and any or all combinations of any two or more said parts, elements or features, and where specific integers are mentioned herein which have known equivalents in the art to which this invention relates, such known equivalents are deemed to be incorporated herein as if individually set forth.

As used herein the term 'and/or' means 'and' or 'or', or where the context allows both.

As used herein the phrase "warehouse AGV" means an automated guided vehicle (AGV) that is used in a warehouse. The term warehouse AGV also means an automated guided vehicle (AGV) that can be used in any indoor environment for industrial applications.

The invention consists in the foregoing and also envisages constructions of which the following gives examples only. In the following description like numbers denote like features.

As used herein "(s)" following a noun means the plural and/or singular forms of the noun.

In the following description, specific details are given to provide a thorough understanding of the embodiments. However, it will be understood by one of ordinary skill in the art that the embodiments may be practiced without these specific details. For example circuits, etc., may be shown in block diagrams in order not to obscure the embodiments in unnecessary detail. In other instances, well-known modules, structures and techniques may not be shown in detail in order not to obscure the embodiments.

Also, it is noted that at least some embodiments may be described as a method (i.e. process) that is depicted as a flowchart, a flow diagram, a structure diagram, or a block diagram. Although a flowchart may describe the operations as a sequential method, many of the operations can be performed in parallel or concurrently. In addition, the order of the operations may be rearranged. A method (i.e. process) is terminated when its operations are completed.

In this specification, the word "comprising" and its variations, such as "comprises", has its usual meaning in accordance with International patent practice. That is, the word does not preclude additional or unrecited elements, substances or method steps, in addition to those specifically recited. Thus, the described apparatus, substance or method may have other elements, substances or steps in various embodiments. The term "comprising" (and its grammatical variations) as used herein are used in the inclusive sense of "having" or "including" and not in the sense of "consisting only of".

BRIEF DESCRIPTION OF THE DRAWINGS

Notwithstanding any other forms which may fall within the scope of the present disclosure, a preferred embodiment will now be described, by way of example only, with reference to the accompanying drawings in which:

FIG. 2b shows a front view of the AGV of FIG. 2a.

FIG. 3 shows a schematic diagram of the collision avoidance apparatus

DETAILED DESCRIPTION OF THE PREFERRED EMBODIMENTS

Figure 1:
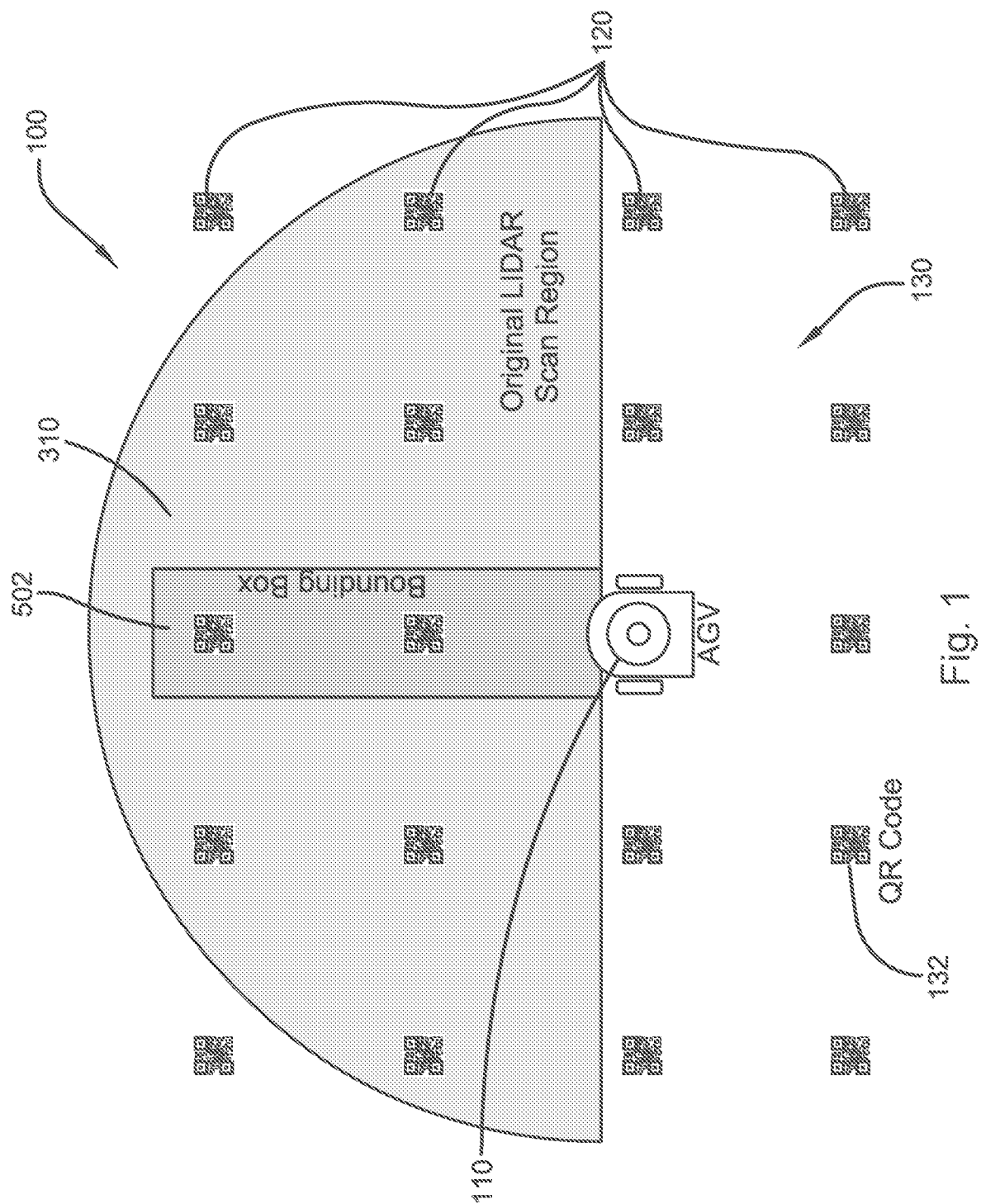
FIG. 1 shows a diagram of an indoor environment with an automated guided vehicle (AGV) operating within the indoor environment.

Warehousing is becoming increasingly popular especially with the increasing popularity of online shopping and delivery of goods. Warehouses are an example of an indoor environment where automated guided vehicles are commonly used. Warehouse automated guided vehicles (AGV) are mobile robots that are used for various materials handling operations. For example, warehouse AGVs are often to move various objects e.g. shelving racks or goods or pallets etc. around the warehouse. One common use of warehouse AGVs is to move shelves or shelving racks from one location to another location within the warehouse (or other indoor environments).

Warehouse automated guided vehicles (AGVs) are mobile robots that can automatically move around an indoor environment based on one or more markers (i.e. waypoints) within the indoor environment. The one or more markers (i.e. waypoints) are generally placed on the floor and the AGVs follow these markers to move around the indoor environment.

Often multiple AGVs are used in an indoor environment e.g. in a warehouse. Due to space constraints in an indoor environment there is always a risk of collisions between AGVs in an indoor environment and/or collisions between the AGVs and other objects within an indoor environment (e.g. a warehouse). Collision avoidance is important in order to increase safety, prevent accidents, maintain efficiency of operations and prevent property damage within the indoor environment.

Collision avoidance sensors are commonly used in AGVs to avoid collisions with objects, people and animals in the vicinity of the AGV. Industrial AGVs, e.g. warehouse AGVs, often use collision sensors such as for example ultrasonic sensors, infrared sensors, contact sensors or bumpers, or vision based systems. The sensors are generally disposed on the AGV at one or more locations. The AGV also comprises a controller that is used to process the sensor output signals and detect the presence of an object in order to control the AGV to avoid a collision.

Ultrasonic and infrared sensors generally only provide a single conical area as the sensing area. These sensors output a detection signal (i.e. sensing signal) that defines a single conical sensing area. Bumpers or contact sensors only provide feedback after contact with an object. These type of contact based sensors are less likely to reduce collisions in some instances because they only work based on contact with another object. Vision based systems generally use a camera and a processor that is configured to process the camera outputs. The processor can be implemented as part of the overall AGV controller. Vision based systems are disadvantageous because they typically require large computational processing power and may also have slower responsive time due to the computational processing burden on the controller.

The present disclosure relates to a collision avoidance apparatus for use with an AGV that provides an improved way to avoid collisions between multiple AGVs within an indoor environment e.g. a warehouse. The present disclosure also relates to an AGV that includes a collision avoidance apparatus that is configured to detect potential collisions and control the AGV to avoid collisions.

FIG. 1 shows a diagram of an indoor environment with an AGV operating within the indoor environment. Referring to figure the indoor environment 100 may be a warehouse. The warehouse 100 may include various objects within the warehouse. With reference also to the example in FIG. 4, there is shown two shelves 102, 104 located adjacent each other in the warehouse. A restricted area may also be defined within the warehouse 100. An AGV 110 is shown operating in the warehouse 100. The AGV 110 can move around the warehouse to perform various materials handling tasks. The AGV includes various components and is configured for performing materials handling tasks such as moving shelving racks or shelves or moving objects from one shelf to another etc. The AGV can be designed with specific components to enable the AGV to perform a required task.

The AGV 110 moves around the indoor environment 100 based on a defined map. The map defines the warehouse 100 and allows paths (i.e. trajectories) of the AGV to be planned and executed. Referring to FIG. 1, the warehouse 100 (i.e. indoor environment) is defined as a series of cells. The warehouse 100 is defined as a two dimensional grid, wherein the floor of the warehouse 100 is defined as a grid.

Referring to FIG. 1 the warehouse 100 includes a plurality of markers 120 that are placed on the ground. The markers 120 are arranged in a two dimensional grid 130 on the floor of the warehouse 100, as shown in FIG. 1. The AGV is programmed to move from one marker to another marker either horizontally or vertically along the grid. The AGV 110 is configured to move in straight lines along the markers 120. Each marker 120 defines an individual cell 132 within the grid 130. The AGV is configured to move in a straight line any number of cells i.e. the AGV can be programmed to move in a straight line a desired number of cells. Additionally the AGV can rotate in place while positioned in one cell i.e. on top of a marker.

The markers 120 as shown in FIG. 1, may be (2D) barcode such as QR codes/AR codes/Data Matrix that are positioned on the floor. The markers 120 may be stickers that are adhered to the floor of the warehouse 100. The stickers each carry a unique ID or barcode denoting a unique cell within the grid 130. The position of the AGV 110 within the indoor environment 100 is based on the detected QR code (i.e. marker 120). The grid 130 that defines the indoor environment 100 may be compiled as a map that may be stored in the AGV memory or may be accessible from a map server. The AGV 110 can automatically move around the grid based on the markers 120.

Figure 2A:
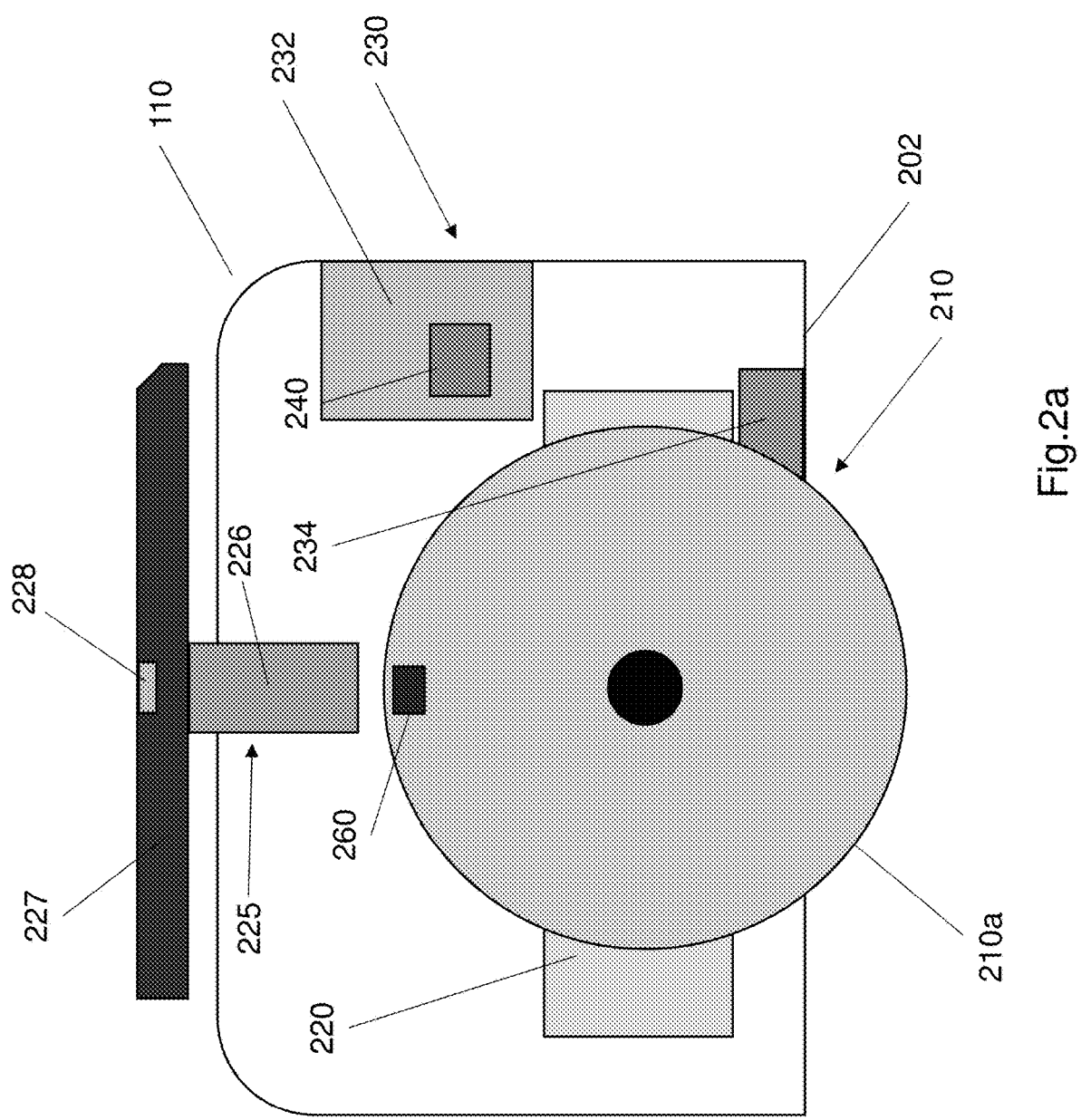
FIG. 2a shows a side view of the AGV from FIG. 1.
Figure 2B:
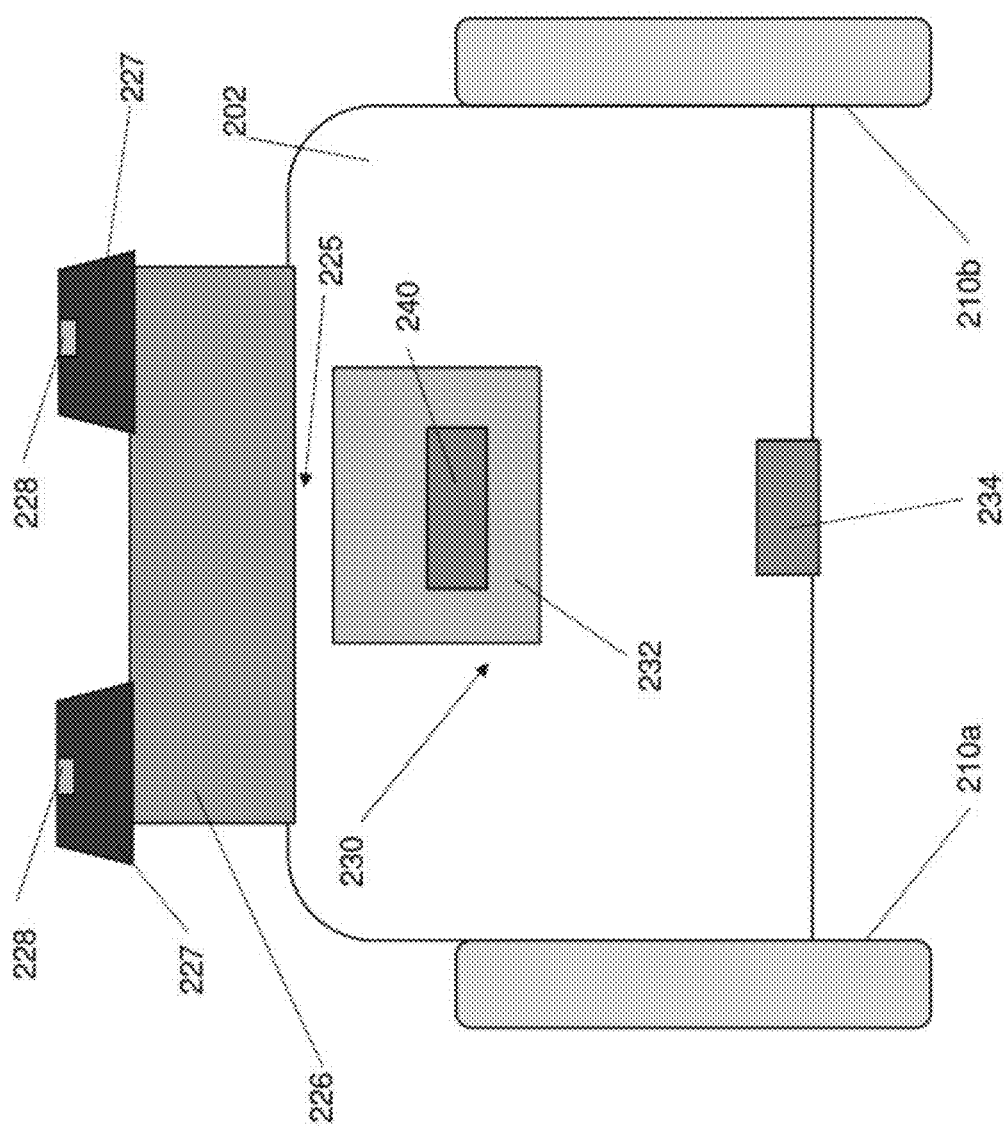

FIGS. 2a and 2b show an example embodiment of an AGV 110. FIG. 2a shows a side view of the AGV 110 and FIG. 2b shows a front view of the AGV 110. FIGS. 2a and 2b also illustrate the internal components of the AGV 110. The AGV 110 comprises a chassis 202. The chassis 202 is substantially rigid and provides a framework to support the other components of the AGV 110. The chassis 202 may include a plurality of frame members that are connected together to define the chassis. The chassis 202 is formed from a rigid material such as a metal e.g. stainless steel or aluminium. The AGV 110 further comprises one or more movement structures 210. The movement structures 210 facilitate movement of the AGV 110.

In the illustrated embodiment the movement structures 210 are wheels. The AGV comprises two wheels 210a, 210b. Alternatively the AGV 110 may comprise more wheels e.g. four wheels or six wheels. In a further alternative the movement structures 210 may be tracks (e.g. similar to vehicle tracks or tank tracks), or rollers or belts or castors or any other suitable movement structures.

The wheels 210a, 210b are mounted on an axle (not shown) that extends through the chassis 202. The AGV 110 comprises a drive assembly 220. The drive assembly 220 is disposed on or within the chassis 202 and is coupled to the movement structures 210 (i.e. wheels 210a, 210b). The drive assembly 220 is configured to engage and drive the wheels 210a, 210b. The drive assembly 220 includes suitable components that are configured to drive the wheels 210a, 210b to propel the AGV 110 along the grid 130. For example, the drive assembly 220 may include a gear box including a plurality of gears, a drive shaft that is coupled to the axle and the gear box and an electronically controlled propulsion unit e.g. a motor. Any suitable drive assembly including suitable component can be used.

The AGV 110 can be used for various materials handling tasks. One example task the AGV 110 can be used for is moving and rearranging shelves or shelving ranks. The AGV 110 comprises a lifting unit 225 coupled to the chassis 202. The lift unit 225 includes a lift mechanism 226 that is mechanically coupled to one or more lifting arms 227. In the illustrated example the AGV comprises a pair of lifting arms 227 that extend outward from the chassis 202. The lifting arms 227 are used to lift shelves or shelving racks and transport them. The lift mechanism 226 comprises a plurality of components such as a mechanical coupling e.g. a chain or belt and a motor. The lift mechanism 226 may include other suitable components. The lift mechanism 226 controls the lifting arms 227 to lift a shelf or place a shelf on the ground. The lifting arms 227 may include one or more contact sensors 228 e.g. capacitive sensors or load cells. The contact sensors 228 are configured to detect contact between the lifting arms 227 and the shelf or shelving rack. The contact sensors 228 are configured to send a signal to the controller 240 when the contact sensors 228 detect contact between the lifting arms 227 and a shelf 102, 104.

The AGV 110 further comprises a collision avoidance apparatus 230. The collision avoidance apparatus 230 comprises an object detection sensor assembly 232. The object detection sensor assembly is mounted on or within the chassis 202. The object detection sensor assembly 232 is configured to generate a detection signal to define a sensing region 310 and receive a reflected detection signal. The object detection sensor assembly 232 comprises an emitter and a receiver. The collision avoidance apparatus 230 further comprises a position detection sensor 234 mounted on or within the chassis 202. The position sensor 234 is configured to generate a position signal and facilitate determination of the position of the AGV 110 within the indoor environment.

The collision avoidance apparatus 230 comprises a controller 240. The controller 240 is arranged in electronic communication with the object detection sensor assembly 232 and the position detection sensor 234. The controller 240 is configured to: process the position signal and determine a position of the automated vehicle within the indoor environment, process the reflected signal to detect presence of an object based on a parameter of the reflected signal, define a boundary within the sensing region 310, dynamically adjust the size and/or shape of the boundary relative to a predetermined position, and determine if the detected object is located within the boundary.

The collision avoidance apparatus 230 may include one or more mounting elements e.g. clips or clamps. The collision avoidance 230 apparatus may be removably connectable to the chassis 202 of the AGV 110. The collision avoidance apparatus 230 can be retro fitted to another AGV via the mounting elements. Optionally the controller 240 may include electrical connections that can be electrically connected to other components of the AGV e.g. the drive assembly to control operation of the drive assembly. The removable collision avoidance apparatus 230 is advantageous as it can be attached to an AGV, thus allowing any AGV to have collision detection and collision avoidance functions. Alternatively the collision avoidance apparatus 230 may be permanently attached to the chassis 202 of the AGV 110. In this alternative configuration the collision avoidance apparatus 230 may be integrated into the chassis 202. The collision apparatus 230 is preferably disposed such that it is oriented in a front region of the AGV.

The AGV 110 further comprises one or more odometers disposed on at least one wheel. In one example configuration an odometer 260 is disposed on a wheel 210. The odometer 260 is configured to measure distance travelled by the wheel. The odometer 260 provides distance travelled by the AGV 110. The odometer 260 is arranged in electronic communication with the controller 240 such that distance information is transmitted to the controller 240. The controller 240 is configured to determine the distance travelled by the AGV 110.

Figure 4:
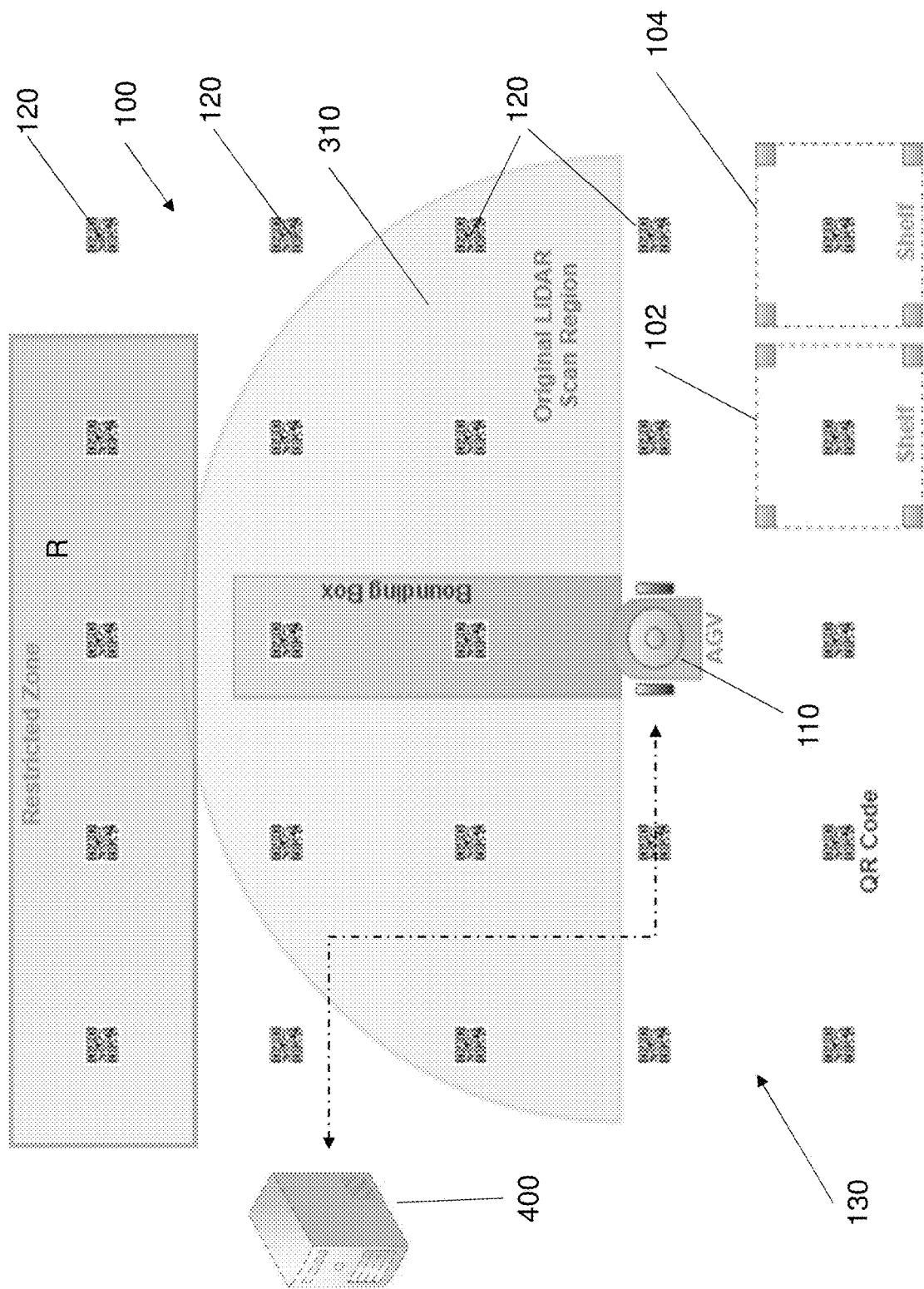
FIG. 4 shows a diagram of the indoor environment with a plurality of markers arranged in a two dimensional grid pattern.

FIG. 3 shows a schematic diagram of the collision avoidance apparatus 230. Referring to FIG. 3 the object detection sensor assembly 232 includes at least one transmitter and one or more receivers. In the illustrated configuration of FIG. 3, the object detection sensor assembly comprises one transmitter 302 and one receiver 304. The transmitter is configured to generate and transmit a detection signal that defines a sensing region i.e. a scan region (the sensing region 310 as shown in FIG. 4). The detection signal may be transmitted as regular pulses or may be continuously transmitted. The receiver is configured to receive a reflected signal that reflects off one or more objects.

The object detection sensor assembly 232 may comprise multiple transmitters and multiple receivers. Each transmitter and receiver may be arranged as a transmitter-receiver pair such that a receiver is positioned adjacent a transmitter. The three transmitter-receiver pairs may be arranged in a predetermined configuration on the chassis 202. For example, the transmitter-receiver pairs may be equally spaced on the AGV, or the transmitter-receiver pairs may be spaced on a front region of the AGV.

The collision avoidance apparatus 230 comprises a position sensor 234. The position sensor 234 is positioned on an underside of the AGV 110. The position sensor 234 is mounted on the chassis 202. The position sensor 234 is a camera or a scanner that is configured to scan markers on the warehouse floor.

The controller 240 is in electronic communication with the position sensor 234 and the receiver 304. The controller 240 is configured to receive sensor outputs and process the sensor outputs. The controller 240 is electronically coupled to the transmitter 302 and configured to control the transmitter 302 to transmit the detection signal as pulses at predetermined intervals. The detection signal pulses may be transmitted at once every 0.5 second or once every second. The controller 240 is further configured to process the reflected detection signal to determine the presence of an object based on a parameter of the reflected signal. The controller 240 may further determine the distance from a detected object and the AGV based on a parameter of the reflected signal. The controller 240 is also configured to process the position signal received from sensor 234 to determine the position of the AGV. The position of AGV 110 is based on detecting a marker by the position sensor 234. The controller 240 is configured to determine the position based on the specific marker that is detected.

The controller 240 is arranged in electronic communication with the transmitter 302, such that the controller can control operation of the drive assembly and the transmitter 302. The controller 240 is configured to control the transmitter 302 to regularly pulse to transmit the detection signal.

The controller 240 may be configured to control the drive assembly 220 in order to control propulsion of the AGV 110. The controller 240 may be configured to apply an appropriate control signal in order to control the drive assembly. The controller 240 is also arranged in electronic communication with the lift mechanism 226 in order to lift an object e.g. shelves or drop the shelves.

FIG. 4 shows diagram of the indoor environment 100 with a plurality of markers 120 arranged in a two dimensional grid pattern 130. As shown in FIG. 4, each marker 120 corresponds to a cell in the grid 130 and each marker 120 corresponds to a specific location in the indoor environment. The position sensor 234 is a bottom facing camera. The camera 234 is configured to detect the codes and navigate from one cell to another. The AGV 110 linearly moves in single direction along the markers. The controller 240 is configured to detect the specific position in the indoor environment 100. The controller 240 may store a map of the indoor environment 100 with the specific locations of each marker being stored in the map. The map may be locally stored and may be updated.

Specific zones in the map may be indicated as restricted zones. The restricted zones are labelled as R on the map. The restricted zones may correspond to areas of the indoor environment 100 that is occupied by a permanent fixture such as a pole, a wall or a piece of equipment etc. The restricted zone may also be a temporarily restricted zone e.g. a temporarily reserved path for another AGV. The multiple AGVs in the indoor environment may be configured to communicate with each other. Each AGV may include a communication unit to allow wireless communication between the various AGVs. The AGVs may communicate their relative position to the other AGVs within the indoor environment 100. Shelves 102, 104 may be represented as restricted zones in the map. Alternatively shelves 102, 104 are positioned within a cell to and cover the marker 120 within the cell. The presence of a shelf is determined by the AGV.

Optionally the map may be stored in a map server 400. The controller 240 may be configured to communicate with a map server to download a map of particular indoor environment. The map server 400 may be a computing device that includes a processor and a memory and a communication unit. The server 400 is configured to wirelessly communicate with the controller 240 via a communication network e.g. a 3G network or 4G network or ZigBee or any other suitable wireless communication network. In this alternative configuration each AGV may communicate its own position within the indoor environment 100 (i.e. within the grid 130) to the map server 400. Each AGV may update its position within the grid 130 at regular time intervals e.g. once every millisecond or once every nanosecond or another suitable time interval. Each AGV is configured to receive an updated map with updated restricted zones at regular intervals e.g. once every millisecond.

As shown in FIG. 4 each AGV 110 outputs a detection signal that defines a sensing region 310. The sensing region 310 is a two dimensional cone shaped sensing region. The object detection sensor assembly 232 is a laser sensor assembly. The transmitter 302 is configured to transmit a laser detection signal. The laser detection signal comprises laser pulses. The pulses are transmitted to define the two dimensional sensing region 310. The sensor assembly 232 is a LIDAR sensor assembly (i.e. a laser radar sensor assembly). The sensor assembly 232 is configured to detect the presence of an object within the sensing region 310 based on a parameter (i.e. characteristic) of the reflected signal. The transmitter emits two dimensional laser pulses that form the sensing region 310. Alternatively the transmitter may be configured to transmit ultraviolet or visible light.

The reflected laser signal is detected by the receiver 304. The controller processes the reflected signal to determine the presence of an object and/or distance to an object based on a parameter of the reflected signal. The controller is configured to determine the presence of an object if a reflected signal is detected. The reflected signal is a laser signal. The controller is also configured to determine the distance between the AGV 110 and the object. The distance is determined based on processing a parameter of the reflected signal. The parameter may be time of flight or frequency or amplitude of the reflected signal.

In one example the time taken to detect the reflected signal can be used to determine the distance between the AGV and the object. The controller may use the formula distance=(speed of light×time of flight)/2. The detection signal and reflected signal wavelength is selected based on the application. The preferred implementation of the controller determines the distance between the AGV and object based on the time taken to detect the reflected signal.

In another example the distance can be determine based on a difference between the reflected signal and detection signal amplitude. The amplitude of the reflected signal is generally less than the detection signal. The amount of reduction of the amplitude or the ratio of detection signal amplitude to reflected signal amplitude is processed to determine the distance between the AGV and object. The reduction in amplitude or ratio of amplitude is proportional to distance. In another example the distance between the object and AGV may be determined based on a change or difference in frequency between the detection signal and the reflected signal.

Figure 5:
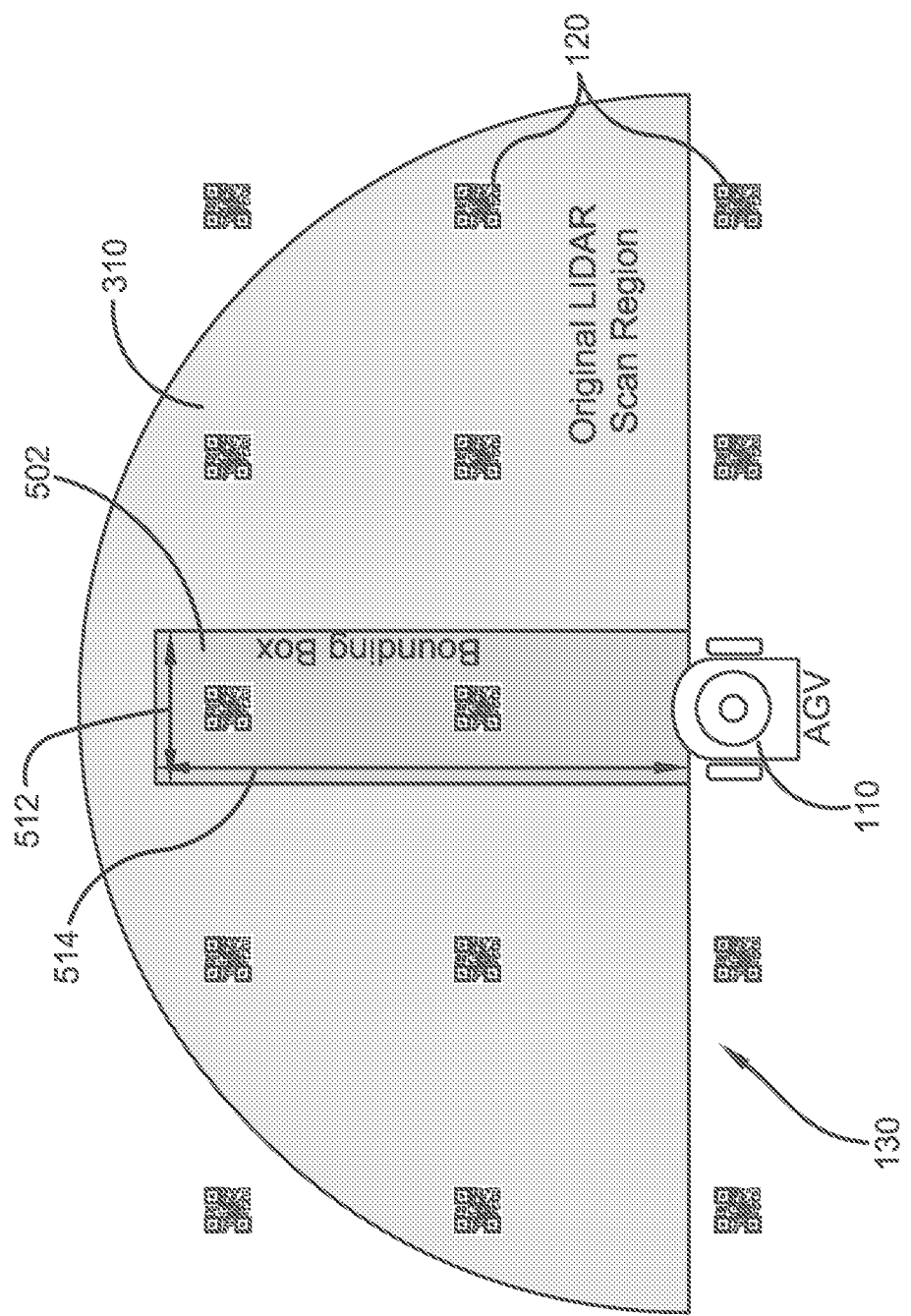
FIG. 5 shows a diagram of a boundary that is overlaid within the sensing region that is used to detect the presence of an object.

FIG. 5 shows a diagram of a boundary 502 that is overlaid within the sensing region. The controller 240 is further configured to define a boundary 502 within the sensing region 310, as shown in FIG. 5. The boundary 502 is a virtual boundary. The boundary 502 may be any predetermined shape. In one example the boundary 502 is a two dimensional polygon. In the illustrated configuration of FIG. 5, the boundary 502 is a rectangle shaped boundary 502. The boundary 502 is a bounding box. The bounding box is virtually positioned in the sensing region 310 e.g. by virtually overlaying the bounding box 502.

The controller 240 is configured to determine the presence of an object within the boundary 502. If the presence of an object is determined within the boundary 502 the controller 240 is configured to control the drive assembly 220 to stop the motion of the AGV. Additionally the controller 240 may be configured to send a signal to control a buzzer or speaker or one or more lights to generate an alert message. The alert message may be an audio or visual or an audio and visual message. For example the alert message may be a siren sound or flashing lights.

Generally, width 512 of the boundary 502 is greater than the width of the AGV 110 to ensure adequate coverage for collision avoidance. The length 514 of the boundary 502 may be predefined to provide an adequate clearance to avoid collisions. The width 512 of the bounding box 502 (i.e. boundary) is broader than the width of the AGV but less than the width of a shelf.

Figure 6:
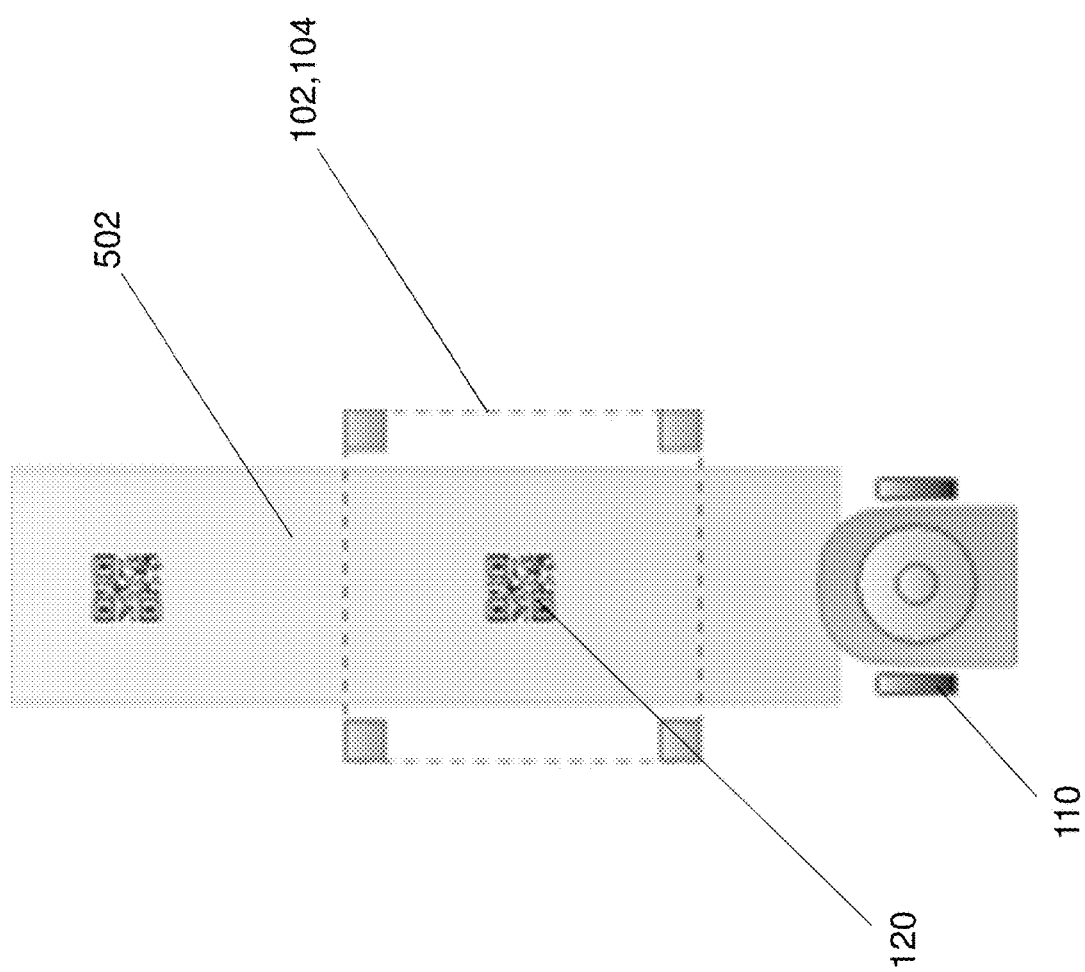
FIG. 6 shows an example of the boundary width being less than the width of the shelf rack.

The width of the bounding box 502 is preferably less than the width between the legs of the shelf. FIG. 6 shows an example of the boundary (i.e. bounding box) 502 where the width 512 being less than the width of the shelf rack 102, 104. This is to help ensure that the AGV 110 can move underneath a shelf without detecting false positives from the shelf legs being detected within the bounding box 502. As described earlier the AGV 110 can move around the indoor environment 100 by following the markers 120. The width of the bounding box 502 being less than the width of the shelf rack legs allows the AGV 110 to move along the markers and pass underneath shelf racks. This allows shelf racks to be positioned within the cells of the indoor environment, which also helps to maximise space usage within the indoor environment 100.

Figure 7:
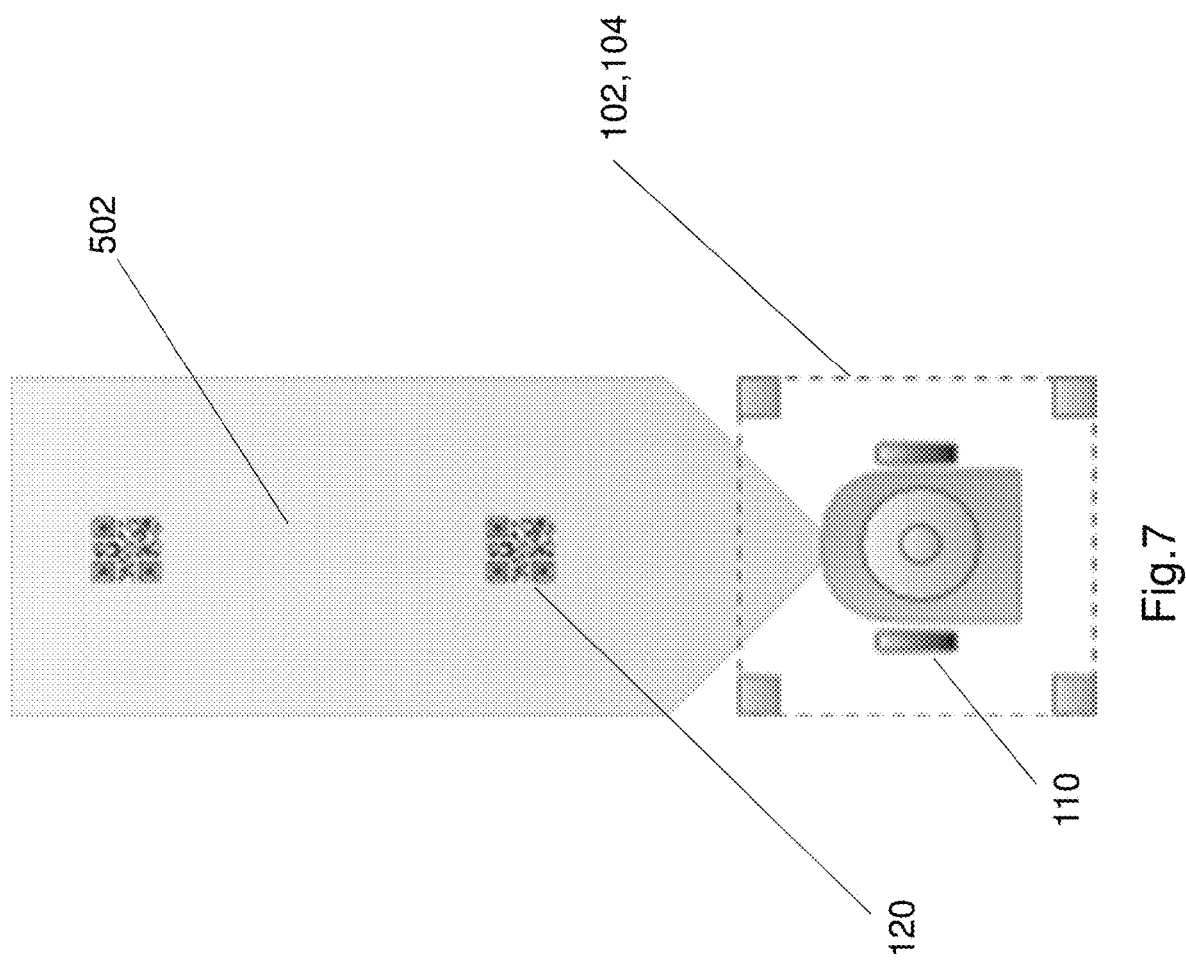
FIG. 7 shows a diagram of the second shape of the bounding box when the AGV is carrying a shelf.

The size and/or shape of the boundary 502 can be dynamically adjusted (i.e. changed) by the controller 240. The shape of the boundary 502 (i.e. bounding box) is adjusted when the AGV 110 is carrying a shelf or a shelving rack. The shape of the bounding box 502 is adjusted from a first shape to a second shape in order to avoid detecting false positives from the legs of the shelf when the AGV 110 is carrying the shelf. FIG. 7 shows a diagram of the second shape of the bounding box 502 when the AGV 110 is carrying a shelf 102, 104.

The AGV 110 is configured to detect the lifting of a shelf 102, 104. The AGV 110 is configured to receive a signal from the contact sensors 228 when the lifting arms 227 are in contact with a shelf 102, 104. The shape of the bounding box 502 changes from a first shape to a second shape when the controller 240 receives a signal from the contact sensors 228. The first shape of the bounding box 502 is a rectangle. The second shape is a triangle extending outwardly from the AGV 110 with a rectangle extending from triangle. The rectangle extends from the base of the triangle. The base of the triangle and width of the rectangle are identical. The second shape may be other shapes e.g. a trapezium or a triangle or rhombus or oval or circle or any other shape. The bounding box forms a two dimensional shape.

Figure 8:
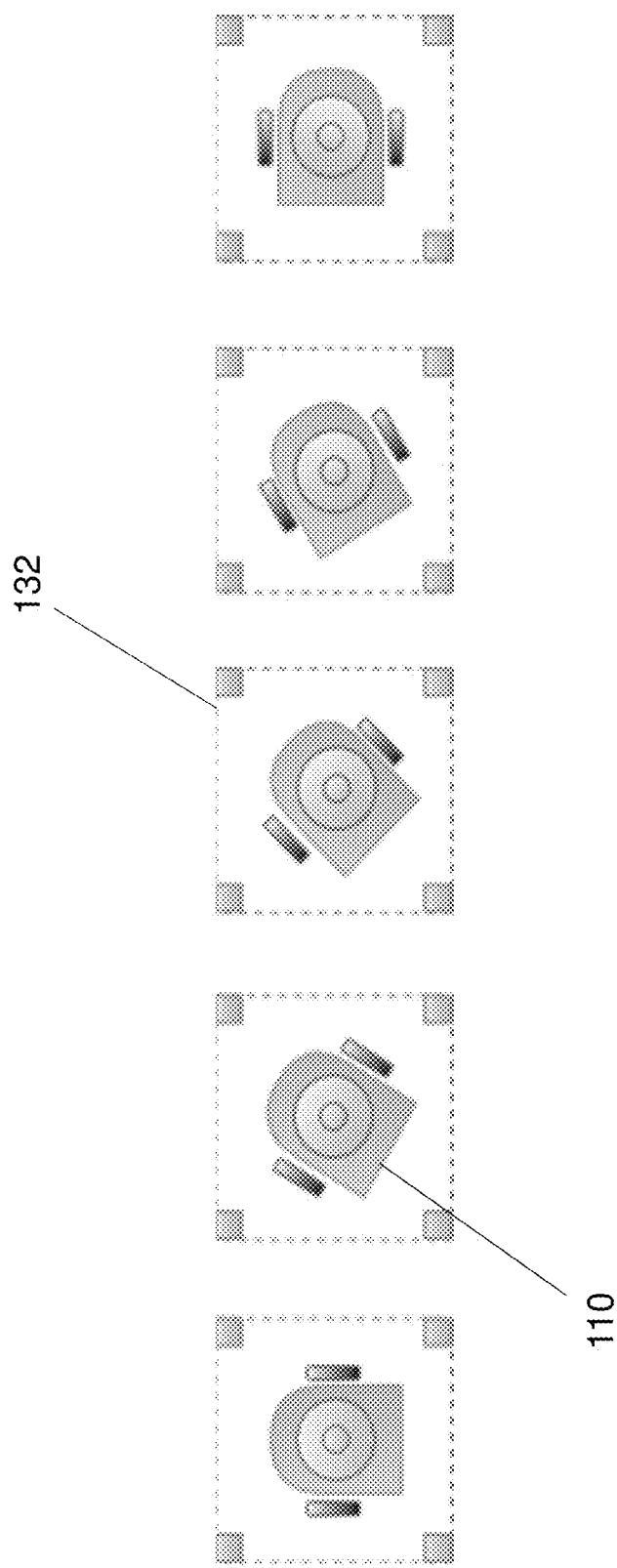
FIG. 8 shows a diagram of the AGV turning when adjacent a marker.

The AGV 110 can rotate when the AGV 110 is within a specific cell. For example, the AGV 110 can move in two dimensions and therefore can turn in order to change direction. The AGV 110 only turns (i.e. rotates) when it is within a cell i.e. when the AGV 110 is adjacent a marker 120. FIG. 8 shows a diagram of the AGV turning when adjacent a marker 120. FIG. 8 shows a series of views of the AGV turning. The AGV 110 has a small turning radius. As shown in FIG. 8 the AGV 110 is configured to rotate on the spot i.e. within a cell of the grid that defines the indoor environment 100. The controller 240 is configured deactivate i.e. disable the bounding box 502 when the AGV is rotating. FIG. 8 shows the AGV 110 turning in a series of diagrams like a time series of the AGV turning. As shown in FIG. 8 the AGV 110 turns within a single cell 132. The bounding box 502 being disabled during turning prevents false positives. Turning in place poses a low risk of collision, since the turning radius is small (i.e. the AGV turns within the cell). During the AGV 110 turning, the controller is configured deactivate the object detection sensor assembly 232 in order to prevent false positives i.e. false detection of an object. In one example at least the transmitter 302 is deactivated by the controller 240 when the AGV 110 is turning.

Figure 9:
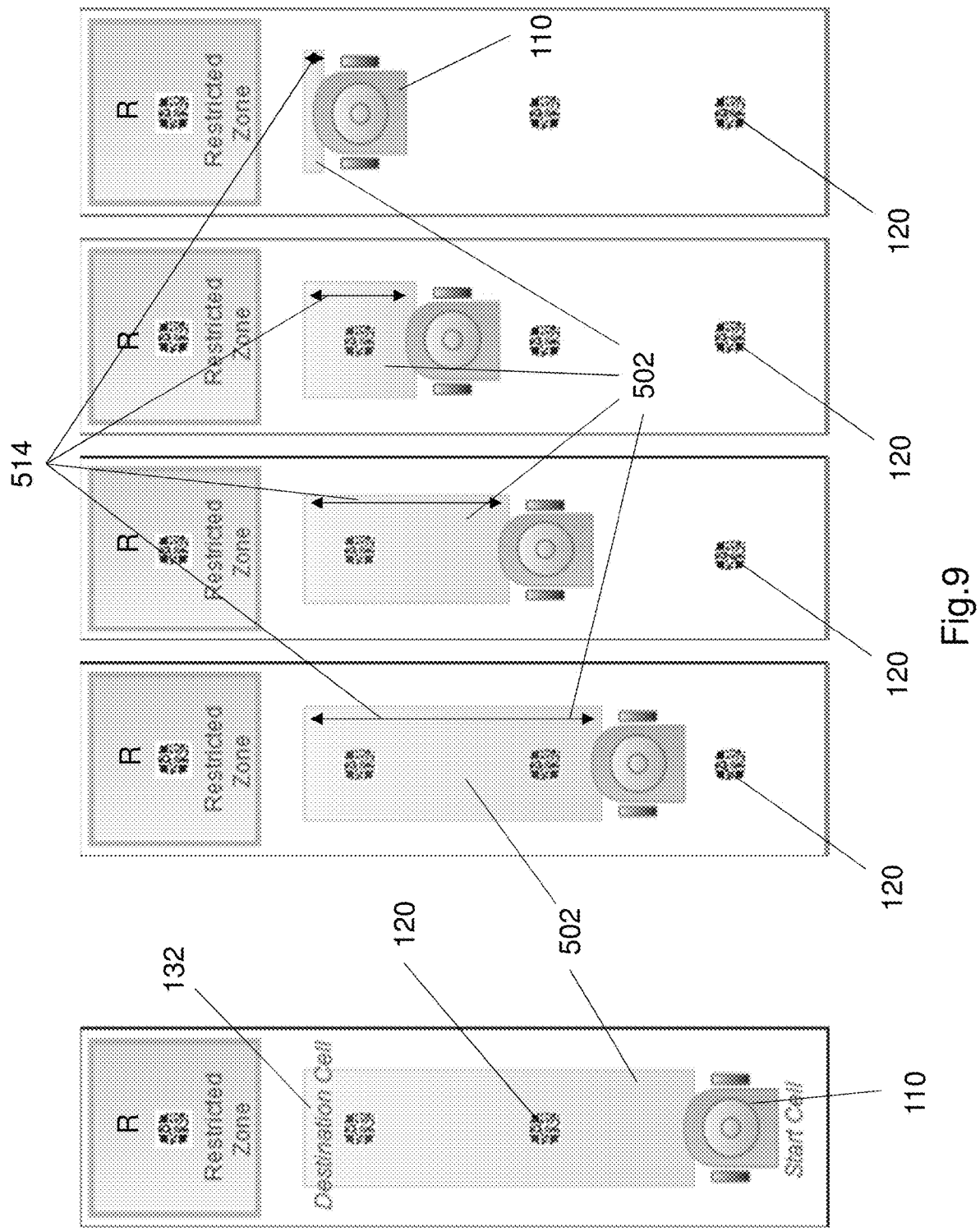
FIG. 9 shows a diagram of the boundary shape and/or size that is varied relative to a predetermined distance.

FIG. 9 shows a diagram of the boundary 502 shape and/or size that is varied relative to a predetermined distance. FIG. 9 shows the AGV moving toward a predetermined position and the size and/or shape of the boundary being adjusted relative to the predetermined position. The shape of the boundary 502 (i.e. bounding box 502) is adjusted i.e. varied. The length 514 of the bounding box 502 is dynamically adjusted. The size and/or shape of the bounding box 502 can be varied or changed relative to a predetermined position. The controller 240 is configured to dynamically adjust the length 514 of the bounding box 502 as the AGV moves. The size and/or shape of the bounding box 502 can be adjusted based on the tracked position of the AGV 110 and based on a trajectory. The trajectory may be predefined by the controller 240 once the controller receives a destination. The destination is generally a predetermined position in the indoor environment 100. The size and/or shape is dynamically adjusted i.e. adjusted in real time.

In one example as the AGV 110 moves forward the size (specifically the length 514) is adjusted relative to a predetermined position of the AGV 110. The length 514 of the bounding box 502 is reduced relative to a predetermined position, wherein the predetermined position is destination on the map. The destination can be predefined and stored in the controller 240 or transmitted to the controller 240. The destination corresponds to a specific marker on the map of the indoor environment 100. The length 514 of the bounding box 502 is decreased by an amount equal to the distance travelled by the AGV from a first location toward the destination. The predetermined position may be defined in a map that is stored in the controller 240. This allows the controller 240 to know the specific position that the AGV 110 is moving toward. The controller 240 may determine a trajectory or path to the specified position (i.e. predetermined position) based on the map of the markers.

Alternatively, the length of the bounding box 502 is reduced by an amount equal to the distance travelled by the AGV 110 since the start of the path. The distance travelled by the AGV 110 can be estimated based on wheel odometry information. This helps to ensure that the AGV 110 always scans only a distance up to its destination cell and not beyond. This can help to reduce processing requirements of the controller and also helps to detect false positives as the AGV 110 is moving toward a destination.

Figure 10:
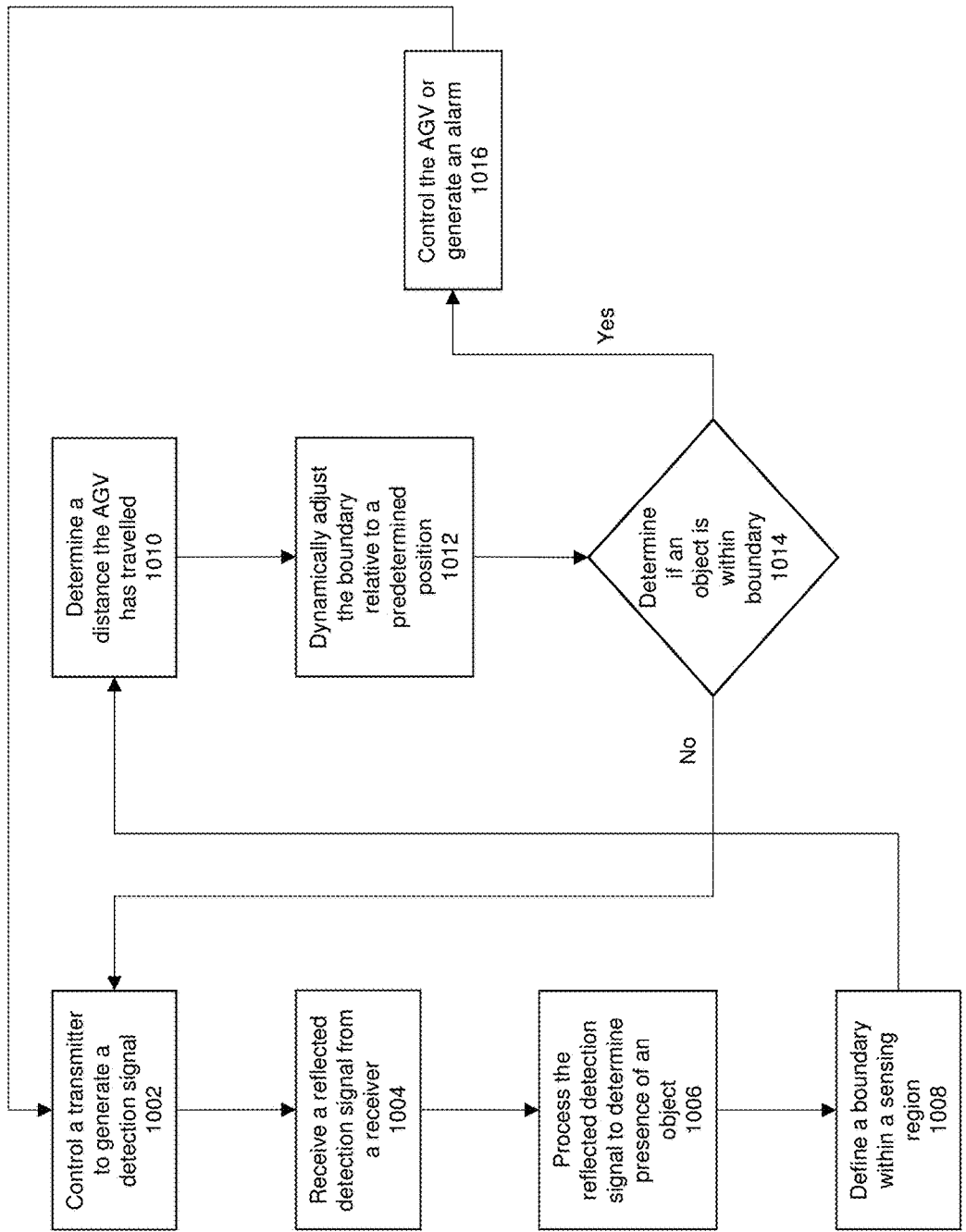
FIG. 10 shows a flow chart of a method of collision avoidance for an automated guided vehicle (AGV) within an indoor environment.

FIG. 10 shows a flow chart of a method of collision avoidance for an automated guided vehicle (AGV) within an indoor environment. Referring to FIG. 10 the method 1000 begins at step 1002. Step 1002 comprises controlling a transmitter to generate and transmit a detection signal. The detection signal forms a sensing region. Step 1004 comprises receiving a reflected detection signal. Step 1006 comprises processing the reflected detection signal to determine presence of an object based on a parameter of the reflected detection signal. The parameter may be time of flight or amplitude or frequency. In one example an object is detected if a reflected detection signal is sensed at a receiver. The distance to the object is determined based on the time of flight or change in frequency of the reflected detection signal. Step 1008 comprises defining a boundary within the sensing region. The boundary is a virtual boundary. The boundary in one example is rectangular shaped bounding box. Step 1010 comprises determining a distance the AGV has travelled relative to a predetermined position (e.g. a destination) in the indoor environment based on distance information received from an odometer on the wheel of the AGV. Step 1012 comprises dynamically adjusting the size and/or shape of the boundary relative to the predetermined position in the indoor environment. The predetermined position may be a destination cell. Step 1014 comprises determining if detected object is located within the boundary. Step 1014 is a decision block. If the controller 240 determines the object is not in the boundary then there is no collision risk. The method reverts back to step 1002. Alternatively the method reverts to step 1012.

If the result of the decision step 1014 is yes, the method proceeds to step 1016. Step 1016 comprises providing a control signal to a drive assembly of the AGV to stop the AGV if an object is detected within the boundary. Step 1016 may additionally include generating an alarm signal to cause an alarm to generate an audible and/or visual alert. Step 1012 comprises adjusting the length of the boundary. The length of the boundary is reduced relative to the predetermined position based on the amount the AGV has moved relative to the predetermined position. More specifically the length of the boundary is reduced by a distance travelled by the AGV relative to the predetermined position. The method 1000 is executed by the controller 240 of the collision avoidance apparatus. The memory unit of the controller 240 stores the method steps as computer readable and executable instructions. The processor of the controller 240 is configured to read the stored instructions and execute the instructions to cause the controller 240 to perform the steps of method 1000. The method 1000 may repeated constantly as long as the AGV is on and moving around the indoor environment. At least steps 1002 and 1004 are repeated at a predetermined rate (i.e. a predetermined regularity). The rest of the steps 1000 are repeated but may be repeated at a different predetermined rate to that of steps 1002 and 1004.

The AGV 110 including the collision avoidance apparatus as described is advantageous because the collision avoidance apparatus detects objects within the path of an AGV to avoid collisions between the AGV and the detected object. The detection of objects within a predefined boundary (i.e. bounding box) assists in reducing collisions since an object detected in the boundary causes the AGV to stop and optionally alarm. The AGV 110 and the collision avoidance apparatus are advantageous because the shape and/or size of the boundary is dynamically adjusted as the AGV moves. This makes reduces the chance of false positives being detected which improves operation and efficiency of AGVs within the indoor environment 100.

Further the adjustable boundary is also advantageous because it provides a more accurate sensing zone that can detect objects that would be an imminent risk of collision. The collision avoidance apparatus as described also provides automation of the AGV and allows multiple AGVs to be used within an indoor environment since false positives are avoided due to the dynamically adjusted boundary. Further the collision avoidance apparatus also allows for improved object detection and helps in providing an improved automated guidance for AGVs.

The dynamically adjustable boundary provides an improved collision avoidance mechanism for use with an AGV in an indoor environment. The dynamically adjusted boundary reduces processing and prevents false positives thereby providing an improved collision avoidance apparatus. The dynamically changing boundary also allows for improved movement of multiple AGVs within an indoor environment because false positive detection is reduced.

In an alternative configuration the markers 120 as described above may be RFID tags that emit a signal. The AGV 110 may include an RFID reader disposed on the chassis of the AGV. Preferably the RFID reader is disposed on an underside of the chassis and mounted such that the RFID reader does not contact the ground in order to prevent the RFID reader from getting damaged. The RFID reader is configured to detect the specific RFID tag and determine the position i.e. specific cell the AGV is located in. The AGV can move and navigate from one cell to the next similar to the method described with respect to FIG. 1.

In another alternative configuration the warehouse 100 may include a plurality of positioning nodes positioned around the warehouse. For example the warehouse 100 may include a position node located at each corner of the warehouse or a node located on each wall of the warehouse. The position nodes may be configured to output a signal at predetermined intervals. The AGV 110 includes a positioning sensor, wherein the position sensor is a receiver unit configured to receive signals from the nodes. The position sensor is arranged in electronic communication with a processor. The processor is configured to determine a position of the AGV within the warehouse based on the detected signals from the position nodes. The position of the AGV 110 may be determined by triangulation of the received signals. The AGV 110 is automatically navigated around the warehouse 100 based on the determined position of the AGV 110.

In a further alternative configuration the warehouse floor may be modelled as on a coordinate system e.g. a global coordinate system. The location of the AGV 110 is determined based on a GPS identified location (i.e. global position system identified location) of the AGV. In this alternative configuration the AGV 110 includes a GPS receiver that is configured to connect to a GPS network and receive position information from the GPS network at regular time intervals. The position of the AGV 110 in the warehouse 100 is identified using the received position information e.g. by using trilateration or triangulation. The GPS receiver always communicates with at least three satellites from the GPS network are predetermined time intervals to obtain position information and determine the position of the AGV 110. The determined position of the AGV in the global coordinate system can be used to navigate the AGV 110 around the warehouse 100. Alternatively the position of the AGV 110 from the GPS system can be further processed to determine the local position of the AGV within the warehouse 100. This location position is calculated regularly at predetermined time intervals such as for example every second. The AGV may be navigated around the warehouse 100 based on the location position of the AGV 110.

In an alternative configuration the AGV 110 comprises an additional drive controller. The drive controller is part of the drive assembly. The drive controller is configured to control the operation of the other drive assembly components e.g. the drive shaft, gearing mechanisms etc. The drive controller may be an electronic controller including electronic components or an electro-mechanical controller that comprises electronic and mechanical components. For example the drive controller may be a PWM control unit that is adapted to control a motor. In this alternative configuration the controller 240 is arranged in electronic communication with the drive controller. The controller 240 is configured to control the drive controller. The controller 240 may be configured to provide a control signal to the drive controller in order to deactivate the drive assembly 220 to stop the AGV 110, if an object is detected within the boundary 502. If no object is detected within the boundary 502 the drive controller is configured to operate the drive assembly such that the AGV 110 is continuously propelled.

In a further alternative configuration the lift unit 225 may comprise a separate lifting controller. The lifting controller is arranged in electronic communication with the lift mechanism. The lifting controller may be an electronic controller that is configured to control the lift mechanism. The lifting controller may be independently operated. The controller 240 may be configured to provide signals to the lifting controller in order to activate or deactivate the lift mechanism. In this alternative configuration the controller 240 may be configured to provide a signal to the lifting controller to lift a shelf when the AGV is determined to be at a specified location. The controller 240 can also provide a signal to the lifting controller to drop a shelf within a specified location when the AGV is determined to be in a specified location.

In an alternative configuration the sensing region may also be adjusted based on the distance travelled by the AGV 110. The size and shape of the sensing region may be adjusted relative to a destination and based on the distance travelled by the AGV 110.

The controller 240 may be configured to control the transmitter such that the sensing region area is adjusted. The controller 240 may control the transmitter 302 to adjust the intensity of the detection signal in order to adjust the size and/or shape of the sensing region. In addition the controller 240 may control transmitter to adjust the pulsing rate of the detection signal in order to adjust the size and/or shape of the sensing region. The length of the sensing region is reduced based on the distance travelled by the AGV 110 from a start point or along a path. The length of the sensing region is decreased by a distance equal to the forward distance travelled by the AGV 110 relative to an initial position. The distance travelled can be estimated from the odometer 260. This helps to make the sensing more accurate, reduce processing power and help to reduce detecting false positives as the AGV 110 moves.

The description of any of these alternative configurations or embodiments is considered exemplary. Any of the alternative features or arrangements in the alternative configurations can be used in combination with each other or with the configurations or embodiments described with respect to the figures. The alternative features and arrangements may also be used in addition to the features in the embodiment of configuration described with respect to the figures.

The foregoing describes only a preferred embodiment of the present invention and modifications, obvious to those skilled in the art, can be made thereto without departing from the scope of the present invention. While the invention has been described with reference to a number of preferred embodiments it should be appreciated that the invention can be embodied in many other forms.

The invention claimed is:

1. A collision avoidance apparatus for use with an automated guided vehicle (AGV), the collision avoidance apparatus comprising:

an object detection sensor assembly, wherein the object detection sensor assembly is configured to generate a detection signal to define a sensing region and receive a reflected detection signal, wherein the object detection sensor assembly comprises at least one emitter and one or more receivers, wherein the at least one emitter is configured to emit a two-dimensional sensing region, and the one or more receivers are configured to receive the reflected signal, the reflected signal being reflected off one or more objects;

a position detection sensor arranged to be mounted on or within a chassis of the automated guided vehicle, the position detection sensor is configured to generate a position signal; wherein the position detection sensor is a camera that is positioned on an underside of the chassis and wherein the camera is configured to scan a plurality of markers arranged in a two-dimensional grid and located on the floor of the environment, and wherein each marker corresponds to a location within the environment;

a controller in electronic communication with the object detection sensor assembly, the controller configured to:
  process the position signal and determine a current position of the automated guided vehicle within the indoor environment, wherein the current position is the location of the first marker being scanned and further adjusted based on a distance travelled by the automated guided vehicle
  process the reflected signal to detect presence of an object based on a parameter of the reflected signal,
  define a boundary within the sensing region,
  dynamically adjust the size and/or shape of the boundary relative to a predetermined position within the environment, wherein the automated guided vehicle is arranged to move in a straight line to the predetermined position corresponding to a second marker from the location corresponding to the first marker, and
  determine if the detected object is located within the boundary, wherein the controller is further configured to overlay the boundary onto the sensing region and to generate a control signal to disable the AGV is an object is detected within the boundary and/or generate an alert, wherein the controller is further configured to adjust a length of the boundary based on the position of the object detection sensor assembly relative to the predetermined position to avoid false positive detection, and wherein the false positive detection includes detecting an object located beyond the boundary.

2. A collision avoidance apparatus in accordance with claim 1, wherein the boundary is a two-dimensional polygon.

3. A collision avoidance apparatus in accordance with claim 1, wherein the controller is configured to resize the boundary once the desired position is reached.

4. A collision avoidance apparatus in accordance with claim 1, wherein the detection signal and reflected signal are optical signals or acoustic signals or infrared signals.

5. A collision avoidance apparatus in accordance with claim 1, wherein the detection signal and reflected signal are laser signals such that the object detection sensor assembly is configured to determine the presence of the object based on the laser detection signal and the laser reflected signal.

6. A collision avoidance apparatus in accordance with claim 1, wherein the collision avoidance apparatus is disposed within a housing and the housing is adapted to be retrofitted to an AGV used within an indoor environment.

7. An automated guided vehicle (AGV) for use within an indoor environment comprising:
   a chassis;
   one or more movement structures supported by the chassis;
   a drive assembly disposed on or within the chassis and being coupled to the one or more movement structures, the drive assembly configured to drive the one or more movement structures;
   a collision avoidance apparatus disposed on the chassis, wherein the collision avoidance apparatus comprising:
      an object detection sensor assembly mounted on or within the chassis, the object detection sensor assembly is configured to generate a detection signal to define a sensing region and receive a reflected detection signal, wherein the object detection assembly comprises a transmitter and a receiver, wherein the transmitter is configured to transmit a two-dimensional detection signal, which defines a two-dimensional sensing region, and wherein the receiver is configured to receive the reflected signal, the reflected signal being reflected off one or more objects;
   a position detection sensor mounted on or within the chassis, the position detection sensor configured to generate a position signal, wherein the position detection sensor is a camera that is positioned on an underside of the chassis and wherein the camera is configured to scan a plurality of markers arranged in a two-dimensional grid and located on the floor of the environment, and wherein each marker corresponds to a location within the environment;
   a controller arranged in electronic communication with the object detection sensor assembly and the position detection sensor, the controller configured to:
      process the position signal and determine a current position of the automated guided vehicle within the indoor environment, wherein the current position is the location of the first marker being scanned and further adjusted based on a distance travelled by the automated guided vehicle;
      process the reflected detection signal to detect presence of an object within the sensing region based on a parameter of the reflected detection signal;
      define a boundary within the sensing region;
      dynamically adjust the size and/or shape of the boundary relative to a predetermined position within the environment, wherein the automated guided vehicle is arranged to move in a straight line to the predetermined position corresponding to a second marker from the location corresponding to the first marker; and
      determine if the detected object is located within the boundary;
   wherein the controller is further configured to overlay the boundary onto the sensing region and to generate a control signal to disable the AGV is an object is detected within the boundary and/or generate an alert, and wherein the controller is further configured to adjust a length of the boundary based on the position of the object detection sensor assembly relative to the predetermined position to avoid false positive detection, and wherein the false positive detection includes detecting an object located beyond the boundary.

8. An automated guided vehicle in accordance with claim 7, wherein the collision avoidance apparatus is removably coupled to the chassis.

9. An automated guided vehicle in accordance with claim 7, wherein the parameter may be one of a time of flight, frequency, or amplitude.

10. An automated guided vehicle in accordance with claim 7, wherein the movement structures are wheels, the AGV comprising two wheels disposed on opposing sides of the chassis and the AGV further comprising at least one odometer disposed on at least one of the two wheels, wherein the odometer gathers distance information relating to the distance travelled by the AGV and transmits distance information to the controller.

11. An automated guided vehicle in accordance with claim 7, wherein the detection signal is a laser signal.

12. An automated guided vehicle in accordance with claim 7, wherein the transmitter is controlled to transmit laser pulses at a predetermined frequency.

13. An automated guided vehicle in accordance with claim 7, wherein the boundary is rectangular in shape and the controller is configured to dynamically vary the size and/or shape boundary as the AGV moves toward the predetermined position.

14. An automated guided vehicle in accordance with claim 13, wherein the length of the boundary is reduced relative to the predetermined position based on the amount the AGV has moved relative to the predetermined position.

15. An automated guided vehicle in accordance with claim 10, wherein the controller is configured to reduce the length of the boundary by the distance travelled by the AGV defined by the distance information.

16. An automated guided vehicle in accordance with claim 7, wherein the boundary is removed once the AGV has reached the predetermined position.

17. An automated guided vehicle in accordance with claim 7, wherein the AGV further comprises a lifting unit that includes a lifting mechanism and one or more lifting arms, the lifting mechanism is coupled to the lifting arms and configured to move the lifting arms, the lifting unit further comprising one or more contact sensors that are configured to detect when the lifting arms are engaged with an object.

18. An automated guided vehicle in accordance with claim 7, wherein, the shape of the boundary is adjusted from a first shape to a second shape when a lifting arm of the AGV is in contact with and lifted an object such that the second shape avoids detecting false positives when the AGV moves with the lifted object.

19. An automated guided vehicle in accordance with claim 18, wherein the first shape is different to the second shape, and wherein the first shape is a rectangle, and the second shape is a triangle extending outwardly from the AGV with a rectangle extending outwardly from the base of the triangle.

20. A method of collision avoidance for an automated guided vehicle (AGV) within an indoor environment comprising the steps of:

receiving a reflected detection signal, the reflected signal being reflected off one or more objects;

processing the reflected detection signal to determine presence of an object based on a parameter of the reflected detection signal;

scanning a plurality of markers arranged in a two-dimensional grid and located on the floor of the environment, wherein each marker corresponds to a location within the environment;

defining a boundary within a sensing region, the sensing region being a two-dimensional sensing region defined by a two-dimensional sensing signal;

determining a current position of the automated guided vehicle within the indoor environment, wherein the current position is the location of the first marker being scanned and further adjusted based on a distance travelled by the automated guided vehicle;

dynamically adjusting the size and/or shape of the boundary relative to a predetermined position within the environment, wherein the automated guided vehicle is arranged to move in a straight line to the predetermined position corresponding to a second marker from the location corresponding to the first marker;

overlaying the boundary onto the sensing region;

adjusting a length of the boundary based on the position of the object detection sensory assembly relative to the predetermined position to avoid false positive detection, wherein false positive detection includes detecting an object located beyond the boundary determining if the detected object is located within the boundary; and providing a control signal to a drive assembly of the AGV to stop the AGV if an object is detected within the boundary.

21. A method of collision avoidance in accordance with claim 20, wherein the boundary is rectangular in shape and the size and/or shape of the boundary are dynamically varied as the AGV moves toward the predetermined position.

22. A method of collision avoidance in accordance with claim 20, wherein the length of the boundary is reduced relative to the predetermined position based on the amount the AGV has moved relative to the predetermined position.

23. A method of collision avoidance in accordance with claim 20, wherein the length of the boundary is reduced by a distance travelled by the AGV relative to the predetermined position.

24. A method of collision avoidance in accordance with claim 23, wherein the distance travelled is determined based on distance information received from one or more odometers that are disposed on a wheel of the AGV.

25. A method of collision avoidance in accordance with claim 20, wherein the method is implemented by a controller comprising a processor and a memory unit, the memory unit storing instructions defining the method steps and the processor configured to process the instructions such that the method steps are executed by the controller.

* * * * *

UNITED STATES PATENT AND TRADEMARK OFFICE
CERTIFICATE OF CORRECTION

PATENT NO. : 11,364,903 B2  
APPLICATION NO. : 16/145738  
DATED : June 21, 2022  
INVENTOR(S) : Fan et al.

Page 1 of 1

It is certified that error appears in the above-identified patent and that said Letters Patent is hereby corrected as shown below:

In the Claims

Claim 1, Column 16, Lines 36 should read as follows: "the reflected detection signal, the reflected detection signal being reflected"

Claim 1, Column 16, Lines 56, 57 should read as follows: "process the reflected detection signal to detect presence of an object based on a parameter of the reflected detection signal"

Claim 1, Column 17, Line 3 should read as follows: "if an object is detected within the boundary and/or"

Claim 4, Column 17, Line 18 should read as follows: "claim 1, wherein the detection signal and reflected detection signal are"

Claim 5, Column 17, Line 21 should read as follows: "claim 1, wherein the detection signal and reflected detection signal are"

Claim 7, Column 17, Lines 49, 50 should read as follows: "configured to receive the reflected detection signal, the reflected detection signal being reflected off one or more"

Claim 7, Column 18, Line 18 should read as follows: "a control signal to disable the AGV if an object is"

Claim 20, Column 19, Line 19 should read as follows: "receiving a reflected detection signal, the reflected detection signal"

Signed and Sealed this  
Sixth Day of September, 2022

Katherine Kelly Vidal  
*Director of the United States Patent and Trademark Office*